United States Patent [19]
Hallerback

[11] 3,717,779
[45] Feb. 20, 1973

[54] BEARING SUPPORT

[75] Inventor: Stig Lennart Hallerback, Vastra Frolunda, Sweden

[73] Assignee: SKF Industrial Trading and Development Company N.V., Amsterdam, Netherlands

[22] Filed: May 20, 1971

[21] Appl. No.: 145,155

[52] U.S. Cl. .................................. 310/91, 310/90
[51] Int. Cl. ............................................. H02k 5/16
[58] Field of Search ...................... 310/89–91, 43, 310/62, 63; 308/132, 148, 184

[56] References Cited

UNITED STATES PATENTS

| | | | |
|---|---|---|---|
| 3,444,402 | 5/1969 | Cartier | 310/43 |
| 3,483,409 | 12/1969 | Philips | 310/90 |
| 3,544,820 | 1/1970 | Wightman | 310/89 |
| 2,874,008 | 2/1959 | Orte | 308/184 |
| 2,650,316 | 8/1953 | Johns | 310/63 |

Primary Examiner—R. Skudy
Attorney—Howson & Howson

[57] ABSTRACT

A bearing support for apparatus having a rotor and a stator member and a bearing assembly for rotatably supporting one of said members on a shaft. The bearing support including a flange made of a non-metallic material connected at its outer edge portion to the stator radially inwardly of the windings and a bearing housing of metallic material connected to the inner edge portion of said flange. The housing including radial portions in direct contact with ambient air to effectively dissipate heat generated by the bearing.

4 Claims, 6 Drawing Figures

3,717,779

BEARING SUPPORT

The present invention relates to electric machines provided with rotor and stator structures and relates more particularly to a bearing support for such electric motors and other rotary electric machines comprising a cup-shaped holder made in part of a non-metallic material, such as synthetic resin, and devised to be rigidly joined by its larger end to the stator radially inside the end coils of the stator windings, and at the smaller end of which a metallic bearing assembly is provided.

Bearing supports for joining to a stator structure inside the end coils and mainly made of synthetic resin are priorly known. They offer several important advantages. However, cooling difficulties are likely to arise in electric motors provided with such bearing supports, due to the fact that the material of the bearing supports is non-metallic and therefore in practice will not conduct away the heat generated in operation efficiently. Dissipating the heat generated at the running of the motor will accordingly involve such difficulties that it would be impossible, without making special arrangements, to keep the operating temperature of the bearing below the tolerated upper level. There arise further temperature difficulties due to the securing to the bearing support of the central rotor bearing assembly made of metal, the coefficient of expansion of which is much smaller than that of the surrounding cup-shaped synthetic resin moulding. When heat from the bearing is conducted away by the poorly heat-conducting moulding the stress at the joint between the materials is thus increased. The difference in temperature between the bearing assembly and the surrounding synthetic resin must not assume such magnitude, either, that there is risk for fractures at the bonding area because of the "heat threshold" existing where heat has to pass from one material to the other. Moreover, if the bearing assembly attains an increased operating temperature due to inefficient dissipation of heat, the synthetic resin moulding will be subject to accelerated aging at the bonding area, which might lead to eccentric displacement of the rotor and, in the worst cases, to fractures. Finally, an increased bearing temperature always exerts a negative influence on the functioning of the bearing as such.

The specific cooling and joining problems referred to above are solved, according to the invention, therethrough that the metallic bearing assembly has been enlarged by radially extending portions, which fix the position of the bearing assembly relative to the non-metallic part of the holder and distribute the heat transmitted from the bearing assembly to the same and which dissipate heat from the rotor assembly to the ambient air.

In a bearing support according to the invention the heat emission takes place essentially from the cooling surface of the metallic assembly to the air, as this cooling surface is not covered by the heat-insulating material of the synthetic resin moulding. The radial portions of the bearing assembly covered by the non-metallic material can be employed for bonding the materials in an efficient way. By providing a heat bridge enlarged in this manner between metallic and non-metallic material the formation of the "heat threshold" referred to may at the same time be avoided, at least partly.

At the manufacture of the metallic bearing structure in the form of a bearing housing an improved cooling and bonding effect can readily be obtained according to the invention by means of punched-out metallic projections or lugs which are fixed to the synthetic resin of the bearing support in such a way that one face of the lug is in direct contact with the air. Hereby also a secondary important reinforcement of the cup-shaped bearing support to prevent creep in the synthetic resin is obtained. Especially when the rotor bearing assembly comprises a rolling bearing, which is mounted directly in the bearing support without the intermediary of a bearing housing, the metallic bearing structure can preferably comprise several parts with enlarged radial sections and with the outer bearing race provided in one of these parts. With the bearing support according to the invention, the present cooling and bonding problems are thus solved in an efficient manner, at the same time as demands on low production cost can be met.

Owing to the fact that the bearing structure is designed as a freely extending part, an effective mounting for the whole motor unit is obtained. A further advantage of this extending part is the fact that it offers a good guiding surface when the synthetic resin formation is being moulded and when the bearing support is mounted in the motor.

Some of the embodiments of the invention will be described hereinafter by way of example with reference to the drawings. In the drawings.

Figure 1:
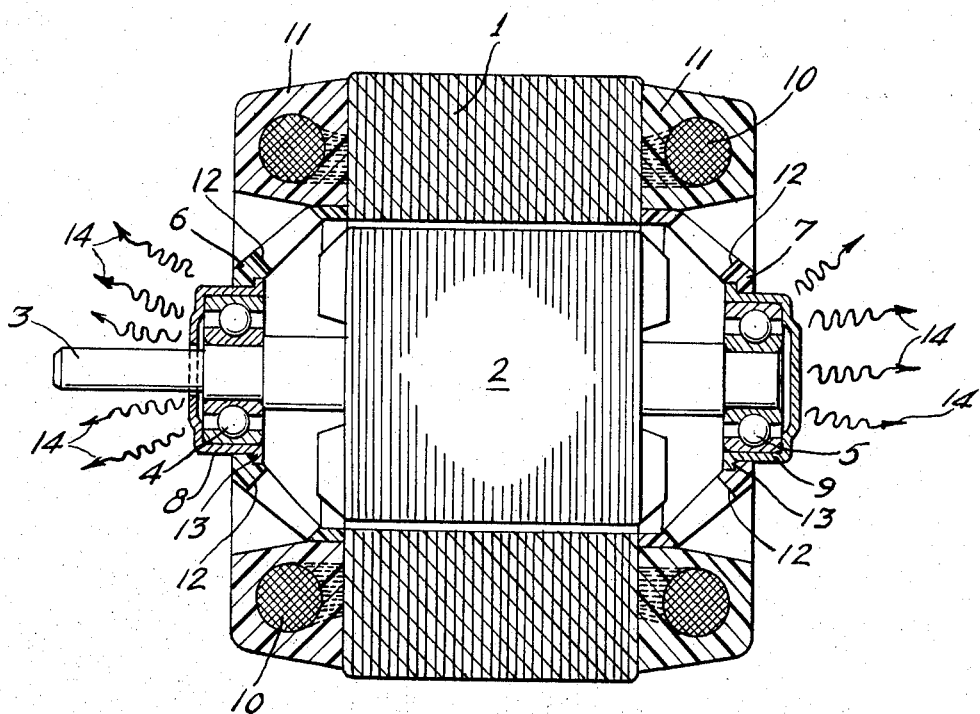
FIG. 1 is an axial section view of an electric motor for building-in purposes with bearing supports according to the invention.

FIG. 1 is a longitudinal section view of an electric motor comprising a laminated stator 1, a rotor 2 with rotor shaft 3, anti-friction bearings 4 and 5 mounted in a bearing support comprising a cup-shaped flange 6 and 7, respectively, made of a synthetic resin, holding rigidly at their smaller ends bearing housings 8 and 9, respectively. At their larger ends the flanges 6,7 are centrically joined to the laminated stator 1 inside its end coils 10, which are embedded in a synthetic resin moulding 11. Spaced cooling openings 12 are arranged in annular rows or in any other suitable manner in the cup-shaped flanges 6,7. The bearing housing 8,9 are rigidly moulded into the flanges 6,7 in such a way that the bearing housings are firmly bonded to the non-metallic material of the flanges by means of an outwardly extending flange 13 at the open inner end of the bearing housings. It is important that the bearing housings are enlarged by essentially radial portions which are not covered by the moulded-on plastic flange and make a direct contact with the ambient air, whereby efficient cooling conditions for the bearings are obtained. This would not be the case if the bearing housings or the bearings were wholly embedded in the heat-insulating synthetic resin which for reason of strength is rather generously dimensioned. The heat-dissipation effect of the bearing supports is indicated in FIG. 1 by arrows 14.

Figure 2:
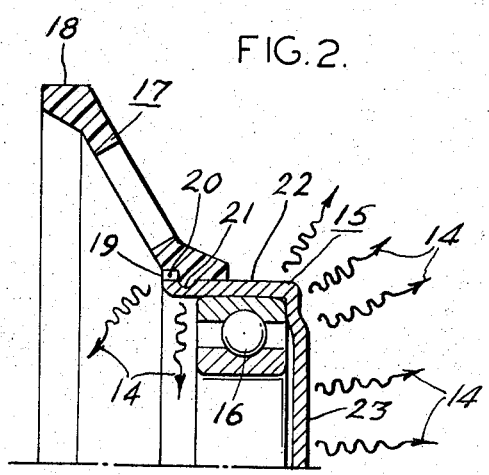
FIG. 2 is a fragmentary axial section view of a bearing support.

FIG. 2 is a longitudinal section view of a bearing support comprising a central metallic bearing housing 15 accommodating a rolling bearing 16. The bearing housing is equipped with a moulded-on frusto-conical synthetic resin flange 17, devised to be joined to the laminated stator by its larger end 18. The frusto-conical flange only extends over a minor part of the central bearing housing of the bearing support. This housing is enlarged, to achieve increased bonding effect, by an essentially radial flange 19 bonded to the synthetic resin. This flange can be formed as at 20 with more or less accentuated teeth or the like to improve the torque resistance of the bond. The axial strength can be further improved by annular grooves 21 formed in the bearing housing 15. The central metallic bearing housing has a cylindrical, free peripheral surface 22 and is enlarged by a radial portion with a free surface 23. Those surfaces together with the free peripheral surfaces of the bearing housing facing inward dissipate the heat generated in the bearing to the ambient air as shown by arrows 14. At the same time as the flange 19 affords a good bonding of the metallic bearing assembly to the moulding, it increases the surface that transmits heat from the bearing housing 15 to the synthetic resin moulding 17 and thus distributes the heat transmission.

Figure 3:
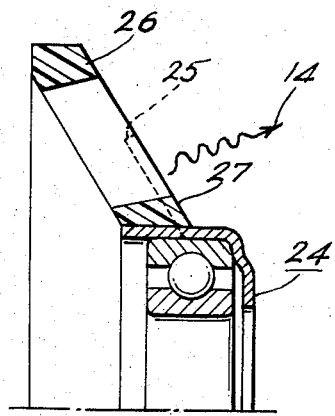
FIGS. 3 and 4 are a fragmentary axial section view and a half-perspective view, respectively, of bearing support having enlarged cooling and bonding surfaces.
Figure 4:
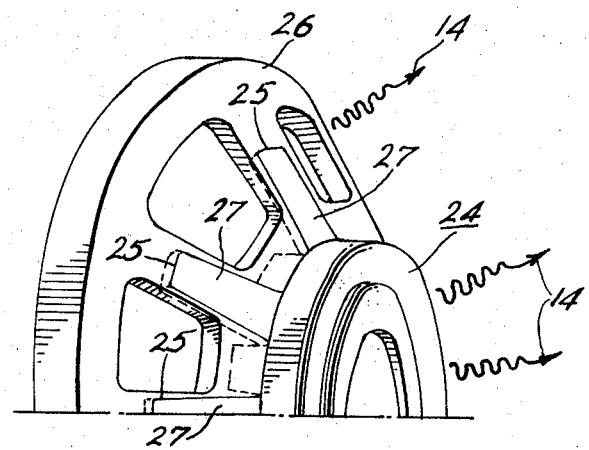

FIG. 3 is a fragmentary axial section view and FIG. 4 is a half-perspective view of a bearing support, the central bearing housing 24 of which has been formed with a number of bent-back spaced sheet metal lugs 25, punched out of the bearing housing wall. These sheet metal lugs considerably improve the bond with the synthetic resin of the fructo-conical flange 26, at the same time as the free surfaces 27 of the sheet metal lugs increase the dissipation of heat to surrounding air as indicated by arrows 14.

Figure 5:
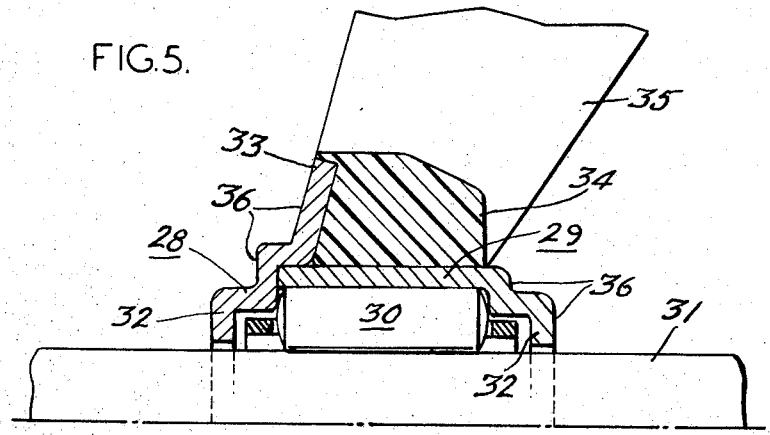
FIG. 5 is a fragmentary section view of a rolling bearing with a two-piece outer ring joined to the synthetic resin material of the bearing support by means of a moulding.

FIG. 5 shows a part of a bearing support, the central bearing assembly of which comprises an axially divided metallic bearing housing 28, 29 with a set of rollers 30 for journalling the shaft 31. Parts 28 and 29 are enlarged by essentially radial portions 32,33. The divided bearing assembly is bonded at its outside to the synthetic resin of the bearing support 34,35 in such a way that a strong adhesion to the synthetic resin moulding is obtained, at the same time as the enlarged free metallic surfaces 36 convey the generated heat to the ambient air.

Figure 6:
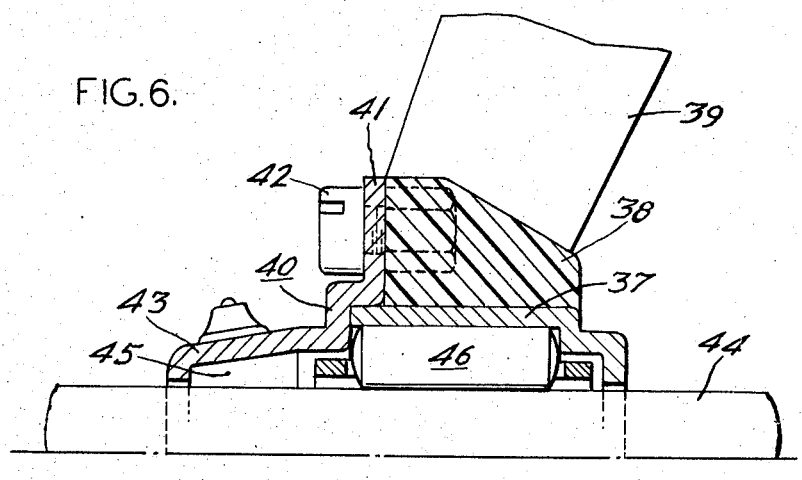
FIG. 6 is a fragmentary section view of a two-piece rolling bearing, the web portion of which is embedded in synthetic resin, while one end face is joined to the synthetic resin in a detachable manner.

FIG. 6 is a fragmentary section view of a central bearing assembly comprising a metallic bearing part 37, which is bonded to the synthetic resin moulding 38, 39, while another bearing part 40 forms a removable end plate 41 which is screwed on by means of screws 42 engaging nuts embedded in the moulding 38. The part 40 is formed with an axially extended portion 43 around the shaft. This extended portion serves as a heat-dissipating means, at the same time as it affords a convenient grease chamber 45 for the set of bearing rollers 46 engaging the shaft 44.

I claim:
1. A bearing support for apparatus having a rotor member and a stator member and a bearing assembly for rotatably supporting one of said members on a shaft, said bearing support comprising a flange made of a non-metallic material connected at its outer edge portion to the stator and a bearing housing of metallic material connected to the inner edge portion of said flange, said housing including radial portions in direct contact with ambient air to effectively dissipate heat generated by the bearing, said housing including a generally cylindrical axial portion terminating in a radially outturned edge adjacent the end thereof connected to said flange, said outturned edge being formed with a plurality of circumferentially spaced teeth to improve the torque resistance of the bond between the flange and housing and means defining an annular groove in the housing adjacent said edge to improve the axial strength of said bond between the non-metallic flange and housing.

2. A bearing support according to claim 1, wherein the metallic bearing assembly comprises a plurality of parts attached to the non-metallic material of the holder in detachable or non-detachable manner.

3. A bearing support for apparatus having a rotor member and a stator member and a baring assembly for rotatably supporting one of said members on a shaft, said bearing support comprising a bearing housing made of a metallic material and including a generally cylindrical axially extending wall portion overlying the bearing assembly, a plurality of circumferentially spaced lugs projecting radially outwardly from said axial wall portion and a flange made of a non-metallic material connected at its outer edge portion to the stator radially inwardly of the windings and bonded at its inner portion to said lugs, said housing including a radial wall portion, said radial wall portion and one face of said lugs being in direct contact with ambient air to effectively dissipate heat generated by the bearing.

4. A bearing support as claimed in claim 1 wherein the flange is made of a synthetic resin.

* * * * *